United States Patent [19]

Kanda et al.

[11] 4,152,483

[45] May 1, 1979

[54] PIGMENT COATED PHOSPHOR AND PROCESS FOR MANUFACTURING THE SAME

[75] Inventors: Katuzo Kanda, Oisomachi; Noboru Kotera, Hatano; Seiji Murakami, Minami-ashigara; Thihiro Yoshida, Hatano; Shusaku Eguchi, Minami-ashigara; Toshiaki Hatsumi; Kazuhito Iwasaki, both of Odawara; Isao Iwamoto, Hiratsuka, all of Japan

[73] Assignee: Dai Nippon Toryo Co., Ltd., Osaka, Japan

[21] Appl. No.: 852,915

[22] Filed: Nov. 18, 1977

[51] Int. Cl.$^2$ .................. C09K 11/02; C09K 11/42
[52] U.S. Cl. .................. 428/403; 428/407; 427/68; 427/71; 427/218; 427/220; 252/301.4 S; 252/301.4 P; 252/301.6 S
[58] Field of Search .................. 427/71, 68, 218, 220, 427/214; 428/403, 407; 252/301.4 S, 301.4 P, 301.6 S

[56] References Cited

U.S. PATENT DOCUMENTS

| | | | |
|---|---|---|---|
| 3,275,466 | 9/1966 | Kell | 427/68 |
| 3,308,326 | 3/1967 | Kaplan | 428/403 |
| 3,875,449 | 4/1975 | Byler | 428/403 |
| 3,886,394 | 5/1975 | Lipp | 427/68 |
| 4,020,231 | 4/1977 | Hedler | 252/301.6 S |
| 4,021,588 | 5/1977 | Royce | 427/68 |
| 4,049,845 | 9/1977 | Lozier | 427/68 |

OTHER PUBLICATIONS

Bennett, Concise Chemical & Technical Dictionary, pp. 520–521, (1974).
Hawley, Condensed Chemical Dictionary, Van Nostrand Reinhold Co., (1971), p. 75.

Primary Examiner—Michael F. Esposito

[57] ABSTRACT

On the surface of a phosphor, pigment particles are uniformly adhered by a layer of a gelatin-gum arabic mixture. A process for manufacturing such a pigment coated phosphor includes the steps of preparing an aqueous solution of gelatin and an aqueous solution of gum arabic, allowing the phosphor to disperse homogeneously into one of these aqueous solutions, allowing the pigment particles to disperse homogeneously into the other aqueous solution, and mixing the so obtained phosphor and pigment dispersions.

14 Claims, No Drawings

PIGMENT COATED PHOSPHOR AND PROCESS FOR MANUFACTURING THE SAME

BACKGROUND OF THE INVENTION

1. Field of the Invention

This invention relates to a phosphor having a coating made of pigment particles (which acts as a color filter), and is called a pigment coated phosphor, and more particularly to pigment coated phosphors employed in cathode ray tubes for color televisions and to the manufacturing process thereof.

2. Description of the Prior Art

As is well known in the art, adhesion of blue pigment particles or red pigment particles to the respective surfaces of blue emitting phosphor particles or red emitting phosphor particles used in a cathode ray tube for color television markedly enhances the contrast of an image formed on the cathode ray tube, because a part of the visible region of the emitted spectra inherent to the uncoated phosphor is cut due to the filter effect of pigment particles adhering thereto resulting in a clearer emission color and further, the pigment particles can absorb a part of the external light to reduce the reflection of light therefrom (as disclosed in Japanese Laid-Open Patent Application No. 50-56146). The following conditions are required in order for pigment particles to exert the above-described effects with high efficiency when coated on phosphors of cathode ray tubes for color televisions;

1. Pigment particles should adhere uniformly to the surface of the phosphor,
2. Adhesion power of the pigment particles to the phosphor must be strong enough to prevent the particles from detaching from the surface of the phosphor during the process of phosphor-coating,
3. Resinous binders employed for allowing pigment particles to adhere to the phosphor must be such that they decompose and vaporize by heat application at the time of fluorescent screen-formation, and so on.

Until now pigment coated phosphors have been manufactured according to the following steps of: (1) dispersing pigment particles into an aqueous solution of a suitable resin such as polyvinyl pyrrolidone (PVP), (2) dispersing phosphor particles into a gelatin solution, (3) mixing the two dispersions and stirring them throughly, and (4) drying the resulting precipitate, as disclosed in, for example, U.S. Pat. No. 3,275,466.

However, such a conventional method is too time-consuming in practical use; for instance, 10 days are required for preparation of the dispersion of pigment particles, several hours are required for formation of the phosphor dispersion and further, several hours are required for drying the precipitate produced and furthermore, the precipitate produced after sufficient mixing must be carefully washed with water. In addition, there are other disadvantages. For example, since in pigment coated phosphors manufactured by such a conventional method as described above the surface of each of the phosphor particles is coated with clusters formed by pigment particles which tend to flocculate, a large quantity of pigment is necessary for obtaining the prescribed rate of coverage of the phosphor surface and therefore, there results a significant decrease in luminance. Further, pigment clusters once adhered to the phosphor surface are easily separated from the phosphor surface by rubbing with a small physical force as, for instance, when treated in a ball mill or the like.

SUMMARY OF THE INVENTION

Therefore, an object of the present invention is to provide a pigment coated phosphor of high contrast and high luminance wherein finely divided pigment particles adhere uniformly and strongly to the surface of a phosphor without flocculation.

Another object of the present invention is to provide a method for manufacturing such a pigment coated phosphor as described in the first object.

These objects can be attained with a phosphor to the surface of which pigment particles adhere uniformly through a layer composed of a gelatin-gum arabic mixture, which is manufactured by a process which comprises (1) preparing an aqueous solution of gelatin and an aqueous solution of gum arabic and homogeneously dispersing a phosphor into one of these aqueous solutions, (2) homogeneously dispersing pigment particles into the other solution and (3) mixing the two dispersions.

DETAILED DESCRIPTION OF THE INVENTION

In accordance with an embodiment of the present invention, there is prepared an aqueous solution of gelatin and an aqueous solution of gum arabic, a phosphor is homogeneously dispersed into one of these aqueous solutions to prepare a phosphor dispersion, and pigment particles are homogeneously dispersed into the other solution to prepare a pigment dispersion. Namely, when a gelatin aqueous solution is employed for preparing the phosphor dispersion, an aqueous solution of gum arabic is employed for preparing the pigment dispersion and vice versa. For homogeneously dispersing phosphor or pigment particles into an aqueous solution of gelatin or gum arabic, conventional means such as a stirrer, a ball mill, a sand mill or the like may be employed. It is desirable for phosphor and pigment particles to be dispersed independently into the respective aqueous solutions in the form of primary particles.

The preferable amount of a pigment to be adhered to a phosphor changes depending upon the kind of phosphor to be used, the kind of pigment used, the desired extent of the final effect resulting from adhesion thereof and so on. However, a pigment is usually used in an amount of not more than 15 parts by weight and, preferably, within the range of 0.1 to 10 parts by weight, per 100 parts by weight of phosphor. When a pigment is used in an amount of more than 15 parts by weight per 100 parts by weight of phosphor, a remarkable decrease in the luminance of the resulting pigment coated phosphor is observed. Both gelatin and gum arabic should be preferably contained in an amount within the range of 0.01 to 1.2 parts by weight per 100 parts by weight of phosphor in the respective aqueous dispersion. Less amounts of gelatin and gum arabic in the respective aqueous dispersions than those of the above-described respective lower limits cannot impart sufficient adhesion power between the pigment particles and the phosphor surfaces, causing unsatisfactory results. On the other hand, when both gelatin and gum arabic are present in excess over the above-described respective upper limits in the respective aqueous dispersions, there is a marked tendency for phosphor particles to flocculate, although such excess amounts do contribute to an increase in the adhesion force between pigment particles and phosphor surfaces. This flocculation causes a lowering in coating efficiency at the time of the formation of a fluorescent screen and, further, imparts undesirable qualities to the fluorescent screen formed. Gelatin and gum arabic are each dissolved in a large quantity of purified water and are usually, used in the form of a diluted solution having a concentration of not more than 5%. Gelatins may be divided into two groups; that is, one group includes gelatins which have received treatment with an alkali in their manufacturing process, and the other includes those which have received treatment with an acid in their manufacturing process. Both of these may be employed in the present invention.

Pigment particles adhere to and then precipitate on the surfaces of phosphor particles when the above-described phosphor dispersion and pigment dispersion are mixed and then stirred. The mixing system is adjusted to a pH value determined as optimum, which ranges generally from 3.0 to 7.0, by taking into account the kind of gelatin, the gelatin content and the gum arabic content. The precipitate produced may be separated in a conventional manner such as by filtration, centrifugation, decantation or the like, and then washed and dried. Thus, a pigment coated phosphor can be produced. Moreover, the strength of adhesion force between pigment particles and the surfaces of phosphor particles can be heightened by the following procedures of cooling the system containing the precipitate produced by mixing the phosphor dispersion and the pigment dispersion and by stirring them thoroughly, and by adding a hardening agent such as formaline, glutaraldehyde, alum, potassium alum, ammonium alum, chrome alum or the like to the resulting cooled system in a proper amount. Of these hardening agents, formaline and glutaraldehyde are particularly preferred.

The manufacturing process of the present invention as described above is applicable mainly to the manufacture of phosphors suitable for color television screens. However, it is not intended to be construed as being limited to such a use, but may be applied to frequently used general phosphors. As examples of phosphors employed in the present manufacturing process, mention may be made of red emitting phosphors including a manganese activated zinc orthophosphate phosphor $[Zn_3(PO_4)_2:Mn]$, a manganese activated magnesium silicate phosphor ($MgSiO_3:Mn$), a silver activated zinc cadmium sulfide phosphor $[(Zn,Cd)S:Ag]$, a europium activated yttrium vanadate phosphor ($YVO_4:Eu$), a europium activated yttrium oxysulfide phosphor ($Y_2O_2S:Eu$), a europium activated yttrium oxide phosphor ($Y_2O_3:Eu$) and so on; orange or yellow emitting phosphors including a manganese activated zinc magnesium fluoride phosphor $[(ZnF_2.MgF_2):Mn]$, a manganese activated potassium magnesium fluoride $[(KF.MgF_2):Mn]$, a manganese activated magnesium fluoride phosphor ($MgF_2:Mn$), a silver activated zinc cadmium sulfide phosphor $[(Zn,Cd)S:Ag]$, a copper activated zinc cadmium sulfide phosphor $[(Zn,Cd)S:Cu]$, lead and manganese activated calcium silicate phosphor ($CaSiO_3:Pb,Mn$) and so on; green emitting phosphors including a manganese activated zinc silicate phosphor ($Zn_2SiO_4:Mn$), a copper activated zinc sulfide phosphor ($ZnS:Cu$), a copper and aluminium activated zinc sulfide phosphor ($ZnS:Cu,Al$), a copper activated zinc cadmium sulfide phosphor $[(Zn,Cd)S:Cu]$, a zinc activated zinc oxide phosphor ($ZnO:Zn$), a silver activated zinc cadmium sulfide phosphor $[(Zn,Cd)S:Ag]$, a silver activated zinc sulfoselenide phosphor $[Zn(S,Se):Ag]$ and so on; and blue or violet emitting phosphors including a calcium tungstate ($CaWO_4$), a silver activated zinc sulfide ($ZnS:Ag$), a silver and aluminium activated zinc sulfide phosphor ($ZnS:Ag,Al$), a silver and chlorine activated zinc sulfide phosphor ($ZnS:Ag,Cl$), a cerium activated calcium magnesium silicate phosphor ($2CaO.MgO.2SiO_2:Ce$), a terbium activated yttrium oxysulfide ($Y_2O_2S:Tb$), a titanium activated calcium magnesium silicate $[(Ca,Mg)SiO_2:Ti]$ and so on. These phosphors which may be employed in the manufacturing process of the present invention have an average diameter ranging preferably from $3\mu$ to $12\mu$.

Examples of pigment particles which may be employed in the manufacturing process of the present invention include red colored pigment particles such as cadmium sulfoselenide $[Cd(S_{1-x},Se_x), 0<x<1]$, rouge ($Fe_2O_3$), cuprous oxide ($Cu_2O$), cadmium mercury red ($CdS+HgS$), red mercury sulfide (HgS), antimony red ($Sb_2S_3$), cupric ferrocyanate $[Cu_2Fe(CN)_6]$, iodine red ($HgI_2$), zinc iron red (Zn—Fe) and other ceramic pigments; orange or yellow colored pigment particles such as basic lead chromate ($PbCrO_4$), chrome yellow ($PbCrO_4$), Chinese Yellow ($Fe_2O_3.SiO_2.Al_2O_3$), cadmium yellow (CdS), titanium yellow ($TiO_2$—NiO—$Sb_2O_3$), litharge (PbO), minium ($Pb_3O_4$), zinc iron yellow (Zn—Fe) and other ceramic pigments; green colored pigment particles such as chrome green $\{PbCrO_4+Fe_4[Fe(CN)_6]_3 \cdot nH_2O\}$, cobalt green ($CoO.nZnO$), chrome oxide ($Cr_2O_3$) and other ceramic pigments; and blue colored pigment particles such as ultramarine ($3NaAl.SiO_2.Na_2S_2$), Prussian blue $\{Fe_4[Fe(CN)_6]_3.nH_2O\}$, cobalt blue ($CoO.nAl_2O_3$), cerulean blue ($CoO.nSnO_2$), cupric sulfide (CuS) and other ceramic pigments. These pigment particles preferrably have average diameters less than $0.5\mu$ in the present manufacturing process.

As examples of combinations of phosphors with pigment particles as above-described which are particularly suitable for use as phosphors of color television screens from a practical point of view, mention may be made of the combination of a europium activated yttrium oxysulfide red emitting phosphor ($Y_2O_2S:Eu$) with cadmium sulfoselenide $[Cd(S_{1-x}.Se_x)]$ or rouge ($Fe_2O_3$) red colored pigment particles and the combination of a silver activated zinc sulfide ($ZnS:Ag$) or a silver and aluminum activated zinc sulfide ($ZnS:Ag,Al$) blue emitting phosphor with cobalt blue ($CoO.nAl_2O_3$) or ultramarine ($3NaAl.SiO_2.Na_2S_2$) blue colored pigments. Of these combinations, the combination of $Y_2O_2S:Eu$ with $Cd(S_{1-x}, Se_x)$ and that of $ZnS:Ag$ or $ZnS:Ag,Al$ with $CoO.nAl_2O_3$ have been studied a great deal for the purpose of practical use. In the present invention, it was found that pigment coated phosphors with good qualities could be obtained when 0.1-2 parts by weight of $Cd(S_{1-x},Se_x)$ or $Fe_2O_3$ was used in a combination with 100 parts by weight of $Y_2O_2S:Eu$. Not more than 0.1 part by weight of red colored pigment particles contributes slightly to the contrast effect, while not less than 2 parts by weight of them causes a drop in luminance. Therefore, the desired pigment coated phosphors cannot be obtained in either case. In addition, the combinations of $ZnS:Ag$ or $ZnS:Ag,Al$ with $CoO.nAl_2O_3$ or $3NaAl.SiO_2.Na_2S_2$ having ratios of amounts of the former to those of latter ranging from 100:0.5 to 100:10 (parts by weight) can provide pigment coated phosphors with good qualities. When blue colored pigment particles are present in amounts of not more than 0.5 parts by weight, they can contribute slightly to the contrast effect, while they cause a decrease in luminance when present in amounts of not less than 10 parts by weight. And so the pigment coated phosphors possessing the intended qualities can not be obtained in either case.

The pigment coated particles obtained in accordance with the present invention have a structural feature that the pigment particles adhere uniformly to the surfaces of the phosphor particles through the layer of the gelatin-gum arabic mixture. The adhesion strength of the pigment particles to the surface of the phosphor attainable in the present process is superior to that which has been attained in the conventional manner. In addition, most of the pigment particles contained in the aqueous dispersion thereof adhere to the surfaces of phosphor particles, which can be confirmed by the fact that pigment particles were scarcely observed either in the filtrate remaining after the filtration of the pigment coated phosphor precipitates produced by mixing the phosphor dispersion and the pigment dispersion, or in the used washing solution left after the washing of the above-described pigment coated phosphor precipitates. On the other hand, not all of either gelatin or gum arabic are utilized for adhesion of pigment particles, but only a part of each is used to form the coat on the surfaces of the phosphor particles, to which the pigment particles are allowed to adhere. This can be confirmed by the fact that both gelatin and gum arabic remained in the filtrate obtained by separating the pigment coated phosphor precipitates from the mixture of the phosphor dispersion and the pigment dispersion.

As is described above, in accordance with embodiments of the present invention, pigment coated phosphors of high luminance and high contrast are provided which have uniform surfaces and have pigment particles are strongly attached thereto without being accompanied by flocculation. In addition, it has been known in conventional microencapsulating processes that a mixture of gelatin and gum arabic is used as a wall-forming material for microencapsulating a core material to produce coacervates. However, such a usage is quite different from that of the present invention, wherein the mixture is used for allowing pigment particles to adhere to the surfaces of phosphor particles, since the known microencapsulating process requires a large quantity of the gelatin-gum arabic mixture amounting to from several tens to several thousands of times the amount used in the present invention. The usage of the gelatin-gum arabic mixture as a bonding agent for allowing pigment particles to adhere uniformly and strongly to the surfaces of phosphor particles without being accampanied by flocculation phenomena was found for the first time in the present invention.

The present invention will now be illustrated in greater detail by reference to the following examples.

EXAMPLE 1

1.0 part by weight of an acid-treated gelatin was dissolved in water heated to 40° C. to prepare a 0.3% aqueous solution of gelatin. To the resulting 0.3% aqueous solution of gelatin was added 100 parts by weight of silver activated zinc sulfide blue emitting phosphor and the resulting mixture was then well stirred with a stirrer so as to be divided into primary particles. A phosphor dispersion was thus obtained.

0.7 part by weight of gum arabic was then dissolved in water to prepare a 0.3% aqueous solution thereof. 4 parts by weight of cobalt blue pigment particles (CoO.$Al_2O_3$) was then added to the 0.3% aqueous solution of gum arabic and well stirred with a stirrer till they became primary particles. A pigment dispersion was thus obtained.

Next, the phosphor dispersion and the pigment dispersion were mixed by stirring. The resulting mixture was adjusted to a pH value of 6.0 and cooled down to a temperature lower than 10° C. To the cooled mixture was added 1 part by weight of formaline drop by drop with continuous stirring. Upon being allowed to stand, the mixture produced a precipitate. The supernatant solution was removed by decantation and the precipitate was washed with water. The washed precipitate was then separated and concentrated using a continuous decanter to yield a pigment coated phosphor cake containing about 85% of solid components. The cake was dried in a stream of air to obtain a pigment coated phosphor.

In the thus obtained pigment coated phoshor, 4 parts by weight of pigment particles were attached to 100 parts of phosphor particles. Uniform adhesion of pigment particles to the surfaces of phosphor particles was confirmed by examination using an electron microscope. The strength of adhesion was superior to that of pigment coated phosphors prepared in a conventional manner as is shown in the following Table 1.

A phosphor slurry was prepared using the thus obtained pigment coated phosphor and was coated on the face plate of a cathode ray tube in a conventional manner which was then subjected to a heat treatment to obtain a fluorescent screen. The thus obtained fluorescent screen exhibited high contrast and high luminance.

EXAMPLE 2

0.8 parts by weight of an alkali-treated gelatin was dissolved in water heated to 40° C. to prepare a 0.3% aqueous solution of gelatin. To the resulting 0.3% aqueous solution of gelatin, 100 parts by weight of a silver activated zinc cadmium sulfide green emitting phosphor [(Zn,Cd)S:Ag] was added and homogeneously dispersed thereinto to such an extent as to become primary particles, using a stirrer. A phosphor dispersion was thus obtained.

0.4 parts by weight of gum arabic was dissolved in water to prepare a 0.5% aqueous solution thereof. Two parts by weight of chrome oxide green colored pigment particles ($Cr_2O_3$) were added to the 0.5% gum arabic aqueous solution and well-dispersed using a stirrer till they became primary particles. A pigment dispersion was thus obtained.

Next, the phosphor dispersion and the pigment dispersion were mixed by stirring. The resulting mixture was adjusted to a pH value of 4.0. A precipitate was produced from the mixture on standing. The supernatant solution was removed by decantation and the precipitate was washed with water. The washed precipitate was then subjected to a separation-concentration treatment using continuous decantation to yield a pigment coated phosphor cake containing about 85% of solid components. The cake was dried in a stream of air to obtained a pigment coated phosphor.

In the thus obtained pigment coated phosphor, 2 parts by weight of pigment particles were attached to 100 parts by weight of phosphor. From the examination of this pigment coated phosphor using an electron microscope, uniform adhesion of pigment particles to the surfaces of phosphor particles could be confirmed. The strength of adhesion achieved with this pigment coated phosphor was superior to those of pigment coated phosphors prepared in a conventional manner as is shown in the following Table 1.

A phosphor slurry was prepared using the thus obtained pigment coated phosphor. It was coated on the face plate of a cathode ray tube in a conventional manner and then was subjected to a heat treatment to obtain a fluorescent screen. The thus obtained fluorescent screen exhibited high contrast and high luminance.

EXAMPLE 3

0.4 Parts by weight of acid-treated gelatin was dissolved in water heated to 40° C. to prepare a 0.5% aqueous solution thereof. A one part by weight of cadmium sulfide selenide red colored pigment [$Cd(S_{0.6},Se_{0.4})$] was added to the resulting 0.5% gelatin aqueous solution and then was homogeneously dispersed thereinto to such an extent as to become primary particles, using a stirrer. A pigment dispersion was thus obtained.

0.3 Parts by weight of gum arabic were then dissolved in water to prepare a 0.3% aqueous solution thereof. 100 parts by weight of a europium activated yttrium oxysulfide red emitting phosphor ($Y_2O_2S:Eu$) was added to the 0.3% gum arabic aqueous solution and well-dispersed thereinto using a stirrer until it was divided into primary particles. A phosphor dispersion was thus obtained.

Next, the pigment dispersion and the phosphor dispersion were mixed by stirring and adjusted to a pH value of 6. A precipitate was produced from the mixture on standing. The supernatant solution was removed by decantation and the precipitate was washed with water. The washed precipitate was then subjected to a separation-condensation treatment using continuous decantation to yield a pigment coated phosphor cake containing about 85% of solid components. The cake was dried in a stream of air to obtain a pigment coated phosphor.

In the thus obtained pigment coated phosphor, 1 part by weight of pigment particles was attached to 100 parts by weight of phosphor. In addition, from the examination of the pigment coated phosphor using an electron microscope, uniform adhesion of the pigment particles to the surfaces of the phosphor particles could be confirmed. The strength of adhesion achieved with this pigment coated phosphor was superior to those of pigment coated phosphors prepared in a conventional manner as is shown in the following Table 1.

A phosphor slurry was prepared using the thus obtained pigment coated phosphor. This was coated on the face plate of a cathode ray tube in a conventional coating manner and then was subjected to heat treatment to obtain a fluorescent screen. The thus obtained fluorescent screen showed high contrast and high luminance.

EXAMPLE 4

0.8 Parts by weight of alkali-treated gelatin were dissolved in water heated to 40° C. to prepare a 0.5% gelatin aqueous solution. 3 Parts by weight of ultramarine blue colored pigment particles ($3NaAl.SiO_2.Na_2S_2$) were added to the resulting 0.5% gelatin aqueous solution and were homogeneously dispersed thereinto to such an extent as to become primary particles using a stirrer. A pigment dispersion was thus obtained.

0.5 Parts by weight of gum arabic were dissolved in water to prepare a 0.5% aqueous solution thereof. 100 Parts by weight of a silver activated zinc sulfide blue emitting phosphor (ZnS:Ag) were added to the 0.5 gum arabic aqueous solution and well-dispersed thereinto using a stirrer till it was divided into primary particles. A phosphor dispersion was thus obtained.

Next, the pigment dispersion and the phosphor dispersion were mixed by stirring and then, adjusted to a pH value of 4. A precipitate was produced from the mixture on standing. The supernatent solution was removed by decantation and the precipitate was washed with water. The washed precipitate was then subjected to a separation-condensation treatment using a continuous decantor to yield a pigment coated phosphor cake containing about 85% of solid components. The cake was dried in a stream of air to produce a pigment coated phosphor.

In the thus obtained pigment coated phosphor, 3 parts by weight of pigment particles were attached to 100 parts by weight of the phosphor. In addition, uniform adhesion of the pigment particles to the surfaces of the phosphor particles could be confirmed by the examination of the pigment coated phosphor obtained using an electron microscope. The strength of adhesion achieved with this pigment coated phosphor was superior to those of pigment coated phosphors prepared in a conventional manner as is shown in the following Table 1.

A phosphor slurry was prepared using the thus obtained pigment coated phosphor. It was coated on the face plate of a cathode ray tube in a conventional coating manner and then, it was subjeced to heat treatment to obtain a fluorescent screen. The thus obtained fluorescent screen exhibited high contrast and high luminance.

EXAMPLE 5

0.6 Parts by weight of an acid-treated gelatin were dissolved in water heated to 40° C. to prepare a 0.3% aqueous solution thereof. 100 parts by weight of a europium activated yttrium oxysulfide red emitting phosphor ($Y_2O_2S:Eu$) was added to the resulting 0.3% gelatin aqueous solution and was dispersed thereinto homogeneously and sufficiently to be divided into primary particles, using a stirrer. Thus, a phosphor dispersion was obtained.

0.4 Parts by weight of gum arabic were dissolved in water to prepare a 0.3% aqueous solution thereof. 0.5 Parts by weight of rouge red colored pigment ($Fe_2O_3$) were added to the 0.3% gum arabic aqueous solution and then, well-dispersed thereinto using a stirrer till they became primary particles. A pigment dispersion was thus obtained.

Next, the phosphor dispersion and the pigment dispersion were mixed with stirring and then, adjusted to a pH value of 6. A precipitate was produced from the mixture on standing. The supernatant solution was removed by decantation, while the precipitate was washed with water. Then, the washed precipitate was subjected to a separation-condensation treatment using a continuous decantor to yield a pigment coated phosphor cake containing an about 85% of solid components. The cake was dried in a stream of air to produce a pigment coated phosphor.

In the thus obtained pigment coated phosphor, 0.5 parts by weight of pigment particles were attached to 100 parts by weight of phosphor particles. In addition, uniform adhesion of the pigment particles to the surfaces of the phosphor particles could be confirmed by the examination of the pigment coated phosphor obtained herein using an electron microscope. The strength of adhesion achieved with this pigment coated phosphor was superior to those of pigment coated phosphors prepared in the conventional manner as is shown in the following Table 1.

A phosphor slurry was prepared using the thus obtained pigment coated phosphor. It was coated on the face plate of a cathode ray tube by conventional coating methods and then, subjected to heat treatment to produce a fluorescent screen. The thus obtained fluorescent screen exhibited high contrast and high luminance.

Table 1

| Run No. | Adhesion Strength (%)** | | | Note |
| --- | --- | --- | --- | --- |
| | Blue Pigment | Red Pigment | Green Pigment | |
| 1 | 95 | — | — | $ZnS:Ag + CoO \cdot Al_2O_3$ |
| 2 | — | — | 92 | $(Zn,Cd)S:Ag + Cr_2O_3$ |
| 3 | — | 87 | — | $Y_2O_2S:Eu + Cd(S_{0.6},Se_{0.4})$ |
| 4 | 89 | — | — | $ZnS:Ag + 3NaAl \cdot SiO_2 \cdot Na_2S_2$ |
| 5 | — | 93 | — | $Y_2O_2S:Eu + Fe_2O_3$ |
| 6* | 65 | — | — | $ZnS:Ag + CoO \cdot Al_2O_3$ (Gelatin-PVP) |
| 7* | — | 70 | — | $Y_2O_2S:Eu\ Cd(S_{0.6},Se_{0.4})$ (Gelatin-PVP) |
| 8* | — | — | 60 | $(Zn,Cd)S:Ag + Cr_2O_3$ (Gelatin-PVP) |

*Pigment coated phosphors prepared by conventional methods, wherein 6, 7 and 8 are blue pigment coated blue emitting phosphor, red pigment coated red emitting phosphor and green pigment coated green emitting phosphor, respectively.

**Values determined by a process which comprised the steps of (1) pouring 10 g of a pigment coated phosphor into a mixture solution consisting of 20 g of purified water, 10 g of a 10% aqueous solution of polyvinyl alcohol and 0.15 g of a 5% aqueous solution of ammonium bichromate and dispersing the pigment coated phosphor therein by vigorous stirring, (2) withdrawing the resulting supernatant solution after one hour's standing and diluting it by a factor of 100 and (3) measuring the transmittance of the diluted solution at wavelengths of 600 nm, 500 nm or 600 nm in the case of a blue pigment coated blue emitting phosphor, a red pigment coated red emitting phosphor or a green pigment coated green emitting phosphor, respectively to determine the adhesion strength. A lower transmittance was taken to indicate weaker adhesion strength because pigment particles liberated from the pigment coated phosphors contribute to the lowering of the transmittance.

We claim:

1. A pigment coated phosphor wherein not more than 15 parts by weight of pigment particles adhere uniformly to the surface of 100 parts by weight of phosphor through a layer of a gelatin-gum arabic mixture.

2. The pigment coated phosphor as defined in claim 1 wherein said pigment particles adhere in an amount ranging from 0.1 part by weight to 10 parts by weight to 100 parts by weight of said phosphor.

3. The pigment coated phosphor as defined in claim 2 wherein a europium activated yttrium oxysulfide phosphor is employed as said phosphor and cadmium sulfoselenide or rouge is employed as said pigment particles and further, said pigment particles adhere in an amount ranging from 0.1 part by weight to 2 parts by weight to 100 parts by weight of said phosphor.

4. The pigment coated phosphor as defined in claim 2 wherein a silver activated zinc sulfide phosphor or a silver and aluminum activated zinc sulfide phosphor is employed as said phosphor and cobalt blue or ultramarine is employed as said pigment particles and further, said pigment particles adhere in an amount ranging from 0.5 to 10 parts by weight to 100 parts by weight of said phosphor.

5. A process for manufacturing a pigment coated phosphor which comprises the steps of preparing an aqueous solution of 0.01 to 1.2 parts by weight of gelatin and an aqueous solution of 0.01 to 1.2 parts by weight of gum arabic, homogeneously dispersing 100 parts by weight of phosphor into one of the aqueous solution, homogeneously dispersing not more than 15 parts by weight of pigment particles into the other aqueous solution and mixing the two resulting dispersions to allow the pigment particles to adhere to the surface of the phosphor.

6. The process for manufacturing a pigment coated phosphor as defined in claim 5 wherein said pigment particles adhere in a proportion ranging from 0.1 to 10 parts by weight per 100 parts by weight of said phosphor.

7. The process for manufacturing a pigment coated phosphor as defined in claim 6 wherein a europium activated yttrium oxysulfide phosphor is employed as said phosphor and cadmium sulfoselenide or rouge is employed as said pigment particles and further, said pigment particles adhere in a proportion ranging from 0.1 to 2 parts by weight per 100 parts by weight of said phosphor to the surface thereof.

8. The process for manufacturing a pigment coated phosphor as defined in claim 6 wherein a silver activated zinc sulfide or a silver and aluminum activated zinc sulfide phosphor is employed as said phosphor and cobalt blue or ultramarine is used as said pigment particles and further, said pigment particles adhere to the surface of said phosphor in a proportion ranging from 0.5 to 10 parts by weight per 100 parts by weight of said phosphor.

9. A process for manufacturing a pigment coated phosphor which comprises the steps of preparing an aqueous solution of 0.01 to 1.2 parts by weight of gelatin and an aqueous solution of 0.01 to 1.2 parts by weight of gum arabic, homogeneously dispersing 100 parts by weight of phosphor into one of the aqueous solutions, homogeneously dispersing not more than 15 parts by weight of pigment particles into the other solution, mixing the two resulting dispersions, cooling the mixed dispersion, and adding a hardening agent thereto to allow the pigment particles to adhere to the surface of the phosphor.

10. The process for manufacturing a pigment coated phosphor as defined in claim 9 wherein formaline is employed as said hardening agent.

11. The process for manufacturing a pigment coated phosphor as defined in claim 9 wherein glutaraldehyde is employed as said hardening agent.

12. The process for manufacturing a pigment coated phosphor as defined in claim 9 wherein said pigment particles adhere to the surface of said phosphor in a proportion ranging from 0.1 to 10 parts by weight per 100 parts by weight of said phosphor.

13. The process for manufacturing a pigment coated phosphor as defined in claim 12 wherein a europium activated yttrium oxysulfide phosphor is employed as said phosphor and cadmium sulfoselenide or rouge is employed as said pigment particles and further, said pigment particles adhere to the surface of said phosphor in a proportion ranging from 0.1 to 2 parts by weight per 100 parts by weight of said phosphor.

14. The process for manufacturing a pigment coated phosphor as defined in claim 12 wherein a silver activated zinc sulfide or a silver and aluminum activated zinc sulfide phosphor is employed as said phosphor and cobalt blue or ultramarine is employed as said pigment particles and further, said pigment particles adhere to the surface of said phosphor in a proportion ranging from 0.5 to 10 parts by weight per 100 parts by weight of said phosphor.

* * * * *